Patented Sept. 11, 1928.

1,683,703

UNITED STATES PATENT OFFICE.

OGDEN S. SELLS, OF HOOPESTON, ILLINOIS, ASSIGNOR TO SPRAGUE-SELLS CORPORATION, OF HOOPESTON, ILLINOIS.

PROCESS OF SEPARATING THISTLE BUDS FROM PEAS.

No Drawing. Application filed September 8, 1924. Serial No. 736,641.

This invention relates to a process of separating thistle buds from peas prior to putting the peas through the necessary step of preparation for canning.

Thistles grow more or less promiscuously throughout the pea fields and in some localities are quite prevalent.

The thistle buds are just forming about the time that peas are harvested and as the thistle stalks and pea vines are gathered at the same time and run through the pea viners or threshers together the thistle buds become detached from the stalks and mingle with the peas. It is therefore, highly desirable that they be removed from the mass of peas prior to treatment for canning.

Many different methods have been tried for the removal of these buds in a commercial way but with only partial success.

Attempts have been made to use a brine solution, but it has been difficult to adjust and maintain a strength or gravity test of brine that would float all of the buds and permit all of the peas to sink. Some peas will float in quite a weak solution, while if the solution is too weak some of the buds will sink with the peas, so that hand removal must finally be resorted to, to remove all of the buds.

Some canners pass the freshly shelled peas over wide belts and depend entirely on human vision and hand operation to effect a separation. This requires a large force of help and adds very materially to the costs of canning.

Some canners also submerge the mixed peas and buds in a simple water bath where all of the peas will sink and some of the thistle buds will float. Those that sink with the peas are afterwards removed by hand.

Applicant has discovered that thistle buds all contain more or less of atmospheric air in and about the interfolded bud petals, and that on account of the compactness of the green undeveloped buds this entrapped air is not easily dispelled, while peas are encased in thick walled pods so that it is improbable that any free air could enter into the pea structure from without, only occluded gases due to natural growth and development being contained therein.

If, therefore, the freshly threshed peas and buds are immersed in a bath of water and the temperature raised to a point where the entrapped air in the buds is expanded, the buds are thereby rendered much more buoyant with the result that all will float and are easily removed as separate groups, while all of the peas will sink no matter what the temperature of the water.

In my experiments I have found that temperatures of the water bath ranging from about 115° to 140° will cover general conditions. In the early mornings, however, the first peas and thistles that are harvested are at times heavy with dew. This is of no consequence as regards the peas, but the dew saturated thistle buds are heavier thereby than those coming later in the day that have been more or less dried out by the sunshine. The temperature of the water bath must then be somewhat higher to counteract this excess moisture and weight by creating sufficient buoyancy in the buds to overcome this moisture. It is therefore necessary to regulate the temperature of the water bath to suit conditions met with where the separation is being conducted.

I mention temperatures ranging from about 115° to 140° but do not mean to imply that a lower temperature than 115° will be ineffective or that a higher temperature than 140° may never be needed. In some sections of the country the thistle buds may be small and light and not need so warm a bath to cause all to float, while in other sections they may run very large and heavy and might need a hotter bath than I have mentioned.

Under ordinary climatic conditions there exists a more or less difference in specific gravity between mixed grades of peas as they come from the thresher and the thistle buds, the most of the buds being somewhat lighter than the peas. In rainy weather, however, the thistle buds become water soaked and thereby increase their weight until the most of them will sink in a cold bath. I have found it desirable, therefore, to regulate the temperature of the bath to suit the general conditions prevailing where the process is being practiced. Whether the temperatures run more or less than I have mentioned, sufficient temperatures must be provided to cause all of the buds to float, whatever the conditions met with.

This process may be practiced with any convenient tank or vessel for holding a body of water. In small establishments the peas and buds could well be handled in ordinary buckets. The hot water placed in the buckets with the mixed mass of peas and buds would cause all of the buds to float when they could be easily skimmed off and the separated peas then removed to a suitable receptacle for further treatment.

Having thus described my invention what I claim as new and desire to secure by Letters Patent is:

1. The process of separating mixed masses of shelled peas and thistle buds having the characteristic of being non-buoyant at normal temperatures, the thistle buds having the added characteristic of acquired buoyancy through contact with an increase in temperature, consisting in submerging mixed masses of peas and thistle buds in a water bath heated to approximately 115° to 150° F., whereby the occluded air in the folded petals of the thistle buds is expanded thus giving buoyancy to said thistle buds and permitting them to separate and float away from the mass, then removing the floating thistle buds before they again sink through a drop in temperature of the liquid bath.

2. The process of separating mixed masses of shelled peas and thistle buds, the entire mass being non-buoyant in a water bath at normal atmospheric temperatures and the peas being non-buoyant at any increase of temperature, while the thistle buds have the characteristic of becoming buoyant in a water bath heated to approximately a temperature ranging from about 115° to 140° F., consisting in submerging a mixed mass of peas and thistle buds in a heated water bath of the stated temperatures, thereby giving to the thistle buds a buoyancy permitting them to separate from the mass and float above the mass, then removing the thistle buds before they again sink through a lowering of the temperature of the water bath.

In testimony whereof I affix my signature.

OGDEN S. SELLS.